United States Patent
Tanigawa et al.

(10) Patent No.: US 9,469,066 B2
(45) Date of Patent: Oct. 18, 2016

(54) FILAMENT WINDING APPARATUS

(71) Applicants: MURATA MACHINERY, LTD., Kyoto-shi, Kyoto (JP); TOYOTA JIDOSHA KABUSHIKI KAISHA, Toyota-shi, Aichi (JP)

(72) Inventors: Motohiro Tanigawa, Kyoto (JP); Tadashi Uozumi, Kyoto (JP); Daigoro Nakamura, Kyoto (JP); Ken Hatta, Toyota (JP)

(73) Assignees: MURATA MACHINERY, LTD., Kyoto (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 413 days.

(21) Appl. No.: 14/210,345

(22) Filed: Mar. 13, 2014

(65) Prior Publication Data

US 2014/0263802 A1 Sep. 18, 2014

(30) Foreign Application Priority Data

Mar. 14, 2013 (JP) .................................. 2013-51923

(51) Int. Cl.
  *B65H 54/64* (2006.01)
  *B29C 53/60* (2006.01)
  *B29C 53/80* (2006.01)

(52) U.S. Cl.
  CPC ......... *B29C 53/602* (2013.01); *B29C 53/8016* (2013.01)

(58) Field of Classification Search
  CPC ... B29C 53/602; B29C 53/66; B29C 53/665; B29C 53/8016; B29C 53/585
  See application file for complete search history.

(56) References Cited

U.S. PATENT DOCUMENTS

| | | | | |
|---|---|---|---|---|
| 4,110,768 A | * | 8/1978 | Numata | G03B 1/12 192/150 |
| 4,511,423 A | * | 4/1985 | Magarian | B29C 53/76 156/175 |
| 7,335,071 B1 | * | 2/2008 | Motsenbocker | B63H 23/30 440/1 |
| 8,403,251 B2 | | 3/2013 | Uozumi et al. | |
| 2009/0038759 A1 | | 2/2009 | Uozumi et al. | |
| 2011/0147160 A1 | * | 6/2011 | Kuehl | F16D 1/10 192/82 R |

FOREIGN PATENT DOCUMENTS

| | | |
|---|---|---|
| JP | 2000102984 A | 4/2000 |
| JP | 2009039951 A | 2/2009 |
| JP | 2009066818 A | 4/2009 |
| JP | 2010-23481 A | 2/2010 |

* cited by examiner

*Primary Examiner* — Emmanuel M Marcelo
(74) *Attorney, Agent, or Firm* — DLA Piper LLP (US)

(57) ABSTRACT

A filament winding apparatus that connects a driven shaft to a driving shaft automatically includes a rotation unit which can rotate a driving shaft 13 forward or reversely, a control unit which can control start or stop of the rotation of the driving shaft, and connection units which can connect a driven shaft attached to a liner to the driving shaft when phases of the driven and driving shafts are in agreement with each other. A fiber bundle is wound onto an outer peripheral surface of the liner by rotating the liner. A detection unit detects the phase of the driven or the driving shaft. Based on information obtained from the detection unit at the time of connecting the driven shaft to the driving shaft, the control unit rotates the driving shaft and adjusts the phase thereof to make the phases of the driven and driving shafts in agreement with each other.

8 Claims, 9 Drawing Sheets

(6A)

(6B)

(6C)

○ detection
● non-detection (7A)

(7B)

(7C)

○ detection
● non-detection

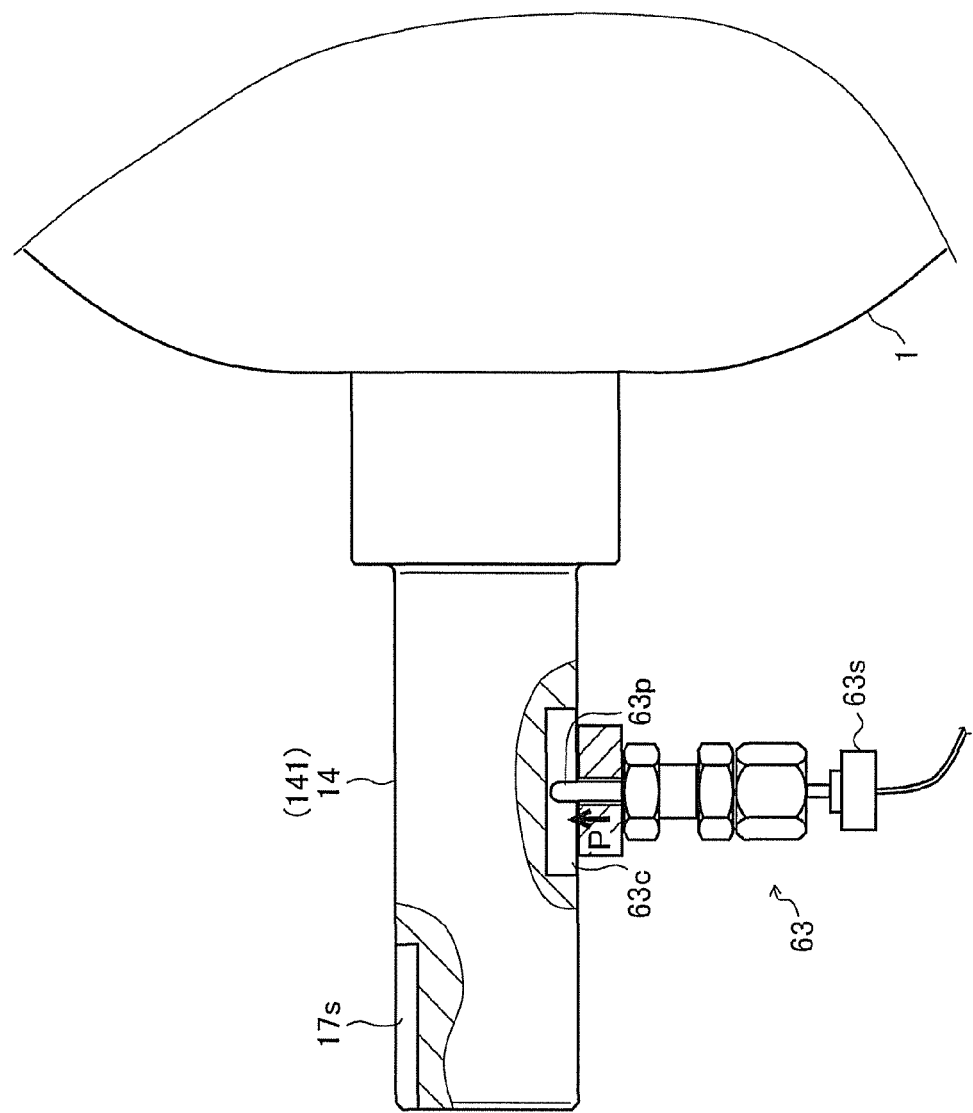

FILAMENT WINDING APPARATUS

CROSS REFERENCE TO RELATED APPLICATIONS

This application claims the benefit of priority under 35 USC 119 of Japanese application no. 2013-51923, filed on Mar. 14, 2013, which is incorporated herein by reference.

BACKGROUND OF THE INVENTION

1. Technical Field

The present invention relates to an art of a filament winding apparatus.

2. Background Art

Conventionally, a filament winding apparatus is known which winds a fiber bundle onto an outer peripheral surface of a liner by rotating the liner (for example, see Japanese Patent Laid Open Gazette 2010-23481). Such a filament winding apparatus has at least a rotation unit and a control unit.

The rotation unit can rotate a driving shaft forward or reversely. The control unit can control start or stop of the rotation of the driving shaft. Such a filament winding apparatus rotates the liner by connecting a driven shaft, attached to the liner, to the driving shaft.

In a conventional filament winding apparatus, connection work of the driven shaft to the driving shaft by an operator is indispensable. However, there is a problem in that the connection work by the operator requires effort and time, whereby production efficiency gets worse. From a viewpoint of improvement of the production efficiency, a filament winding apparatus which can connect the driven shaft to the driving shaft automatically is required.

SUMMARY OF THE INVENTION

Problems to be Solved by the Invention

The purpose of the present invention is to provide a filament winding apparatus which can connect a driven shaft to a driving shaft automatically.

Means for Solving the Problems

Next, means for solving the problems are explained.

The first invention is a filament winding apparatus having a rotation unit which can rotate a driving shaft forward or reversely, a control unit which can control start or stop of the rotation of the driving shaft, and a connection unit which can connect a driven shaft, attached to a liner, to the driving shaft when phases of the driven shaft and the driving shaft are in agreement with each other, wherein a fiber bundle is wound onto an outer peripheral surface of the liner by rotating the liner. A detection unit is provided which can detect the phase of the driven shaft or the driving shaft. Based on information obtained from the detection unit at the time of connecting the driven shaft to the driving shaft, the control unit rotates the driving shaft and adjusts the phase thereof so as to make the phases of the driven shaft and the driving shaft in agreement with each other.

The second invention is subject to the first invention, wherein a slide unit is provided which can slide the driving shaft along an axial direction, and wherein after rotating the driving shaft and adjusting the phase thereof so as to make the phases of the driven shaft and the driving shaft in agreement with each other, the control unit slides the driving shaft along the axial direction so as to connect the shafts to each other.

The third invention is subject to the first or second invention, wherein the connection unit engages a key or a key groove of the driven shaft with a key groove or a key of the driving shaft so as to connect the shafts to each other.

The fourth invention is subject to the third invention, wherein the detection unit has an optical sensor detecting the key or the key groove of the driven shaft or the key groove or the key of the driving shaft.

The fifth invention is subject to the fourth invention, wherein the detection unit has two optical sensors with an interval larger than a width of the key or the key groove in a peripheral direction of the driven shaft or the driving shaft, and has one optical sensor between the two optical sensors.

The sixth invention is subject to one of the first to fifth inventions, wherein a supply unit is provided which can move while the liner is mounted thereon and supply the liner to a predetermined position at which the driven shaft is connected to the driving shaft, and wherein the supply unit supplies the liner to the predetermined position so as to make the phase of the driven shaft a predetermined value.

The seventh invention is subject to the sixth invention, wherein a judgment unit is provided which can judge whether the liner is mounted so as to make the phase of the driven shaft the predetermined value or not, and wherein the supply unit supplies the liner to the predetermined position after the judgment unit judges that the liner is mounted so as to make the phase of the driven shaft the predetermined value.

The eighth invention is subject to the sixth or seventh invention, wherein a discharge unit is provided which can discharge the liner from the predetermined position and move while the liner is mounted thereon, and wherein the supply unit supplies the new liner to the predetermined position after the discharge unit discharges the liner from the predetermined position and makes the liner move.

Effect of the Invention

The present invention brings the following effects.

According to the first invention, based on the information obtained from the detection unit at the time of connecting the driven shaft to the driving shaft, the control unit rotates the driving shaft and adjusts the phase thereof so as to make the phases of the driven shaft and the driving shaft in agreement with each other. Accordingly, the phases of the driven shaft and the driving shaft can be made in agreement with each other automatically.

According to the second invention, after rotating the driving shaft and adjusting the phase thereof so as to make the phases of the driven shaft and the driving shaft in agreement with each other, the control unit slides the driving shaft along the axial direction so as to connect the shafts to each other. Accordingly, the driven shaft can be connected to the driving shaft automatically.

According to the third invention, the connection unit engages the key or the key groove of the driven shaft with the key groove or the key of the driving shaft so as to connect the shafts to each other. Accordingly, the driven shaft can be connected to the driving shaft certainly with simple construction.

According to the fourth invention, the detection unit has the optical sensor detecting the key or the key groove of the driven shaft or the key groove or the key of the driving shaft.

Accordingly, failure or error detection caused by wear can be prevented certainly so as to detect the phase of the driven shaft or driving shaft.

According to the fifth invention, the detection unit has the two optical sensors with the interval larger than the width of the key or the key groove in the peripheral direction of the driven shaft or the driving shaft, and has the one optical sensor between the two optical sensors. Accordingly, the phase of the driven shaft or driving shaft can be detected with high accuracy.

According to the sixth invention, the supply unit supplies the liner to the predetermined position so as to make the phase of the driven shaft the predetermined value at the time of connecting the driven shaft to the driving shaft. Accordingly, the phase of the driven shaft is fixed.

According to the seventh invention, after the judgment unit judges that the liner is mounted so as to make the phase of the driven shaft the predetermined value, the supply unit supplies the liner to the predetermined position. Accordingly, the phase of the driven shaft is fixed certainly.

According to the eighth invention, after the discharge unit discharges the liner from the predetermined position, the supply unit supplies the new liner to the predetermined position. Accordingly, the time for exchanging the liner can be shortened.

BRIEF DESCRIPTION OF THE DRAWINGS

FIG. 9 is a drawing of a construction in which the driven shaft can be mounted so as to make the phase thereof a predetermined value.

DETAILED DESCRIPTION OF THE INVENTION

Firstly, an explanation will be given briefly on a filament winding apparatus 100 (hereinafter, referred to as "FW apparatus 100") according to this embodiment.

Figure 1:
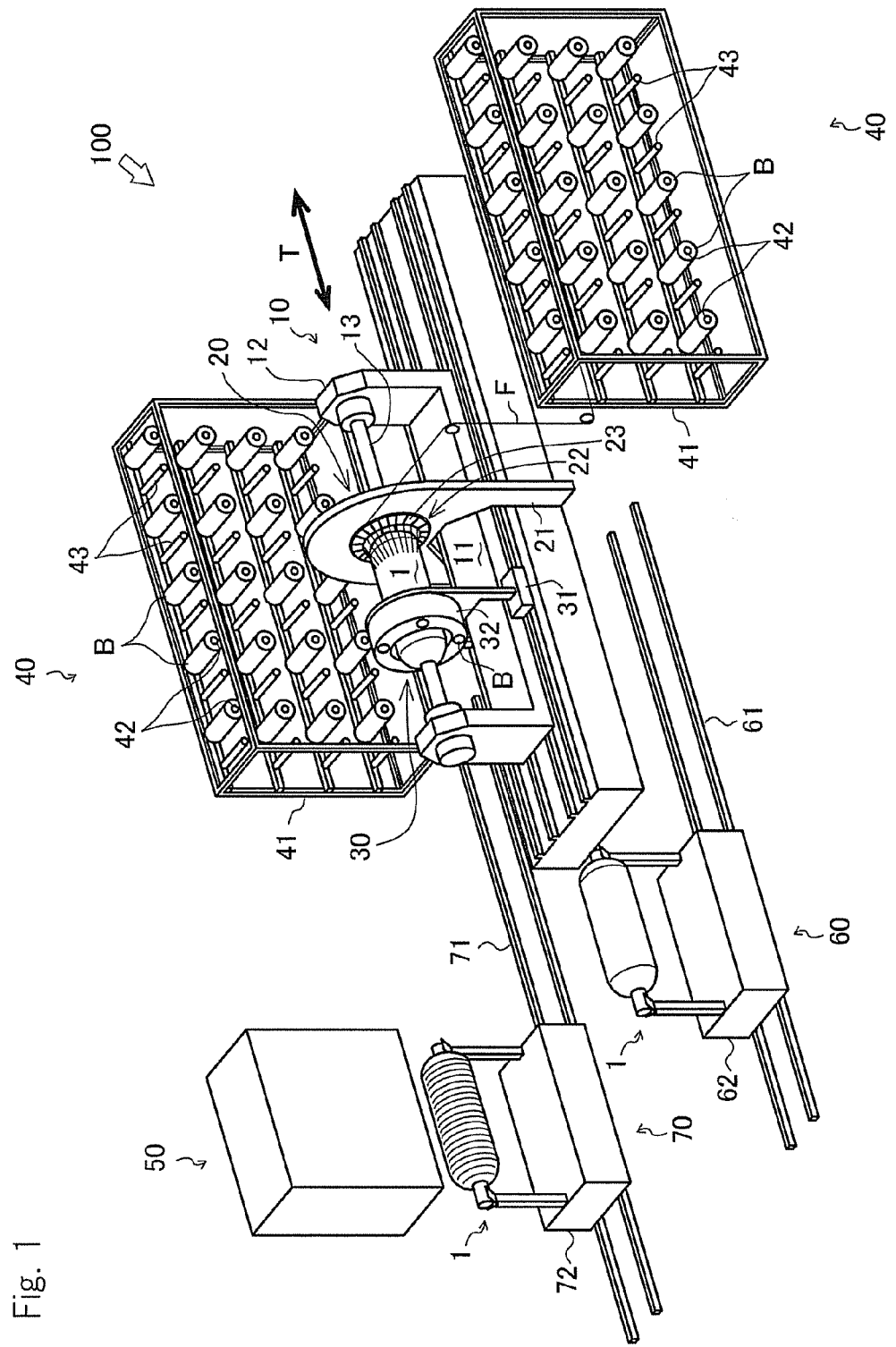
FIG. 1 is a drawing of an entire configuration of a filament winding apparatus.

FIG. 1 is a drawing of the entire configuration of the FW apparatus 100. An arrow T in the drawing shows a transport direction of a liner 1. Herein, it is defined that the transport direction of the liner 1 is a longitudinal direction of the FW apparatus 100, and one of the sides to which the liner 1 is transported is a front side and the other side is a rear side.

The FW apparatus 100 winds a fiber bundle F onto an outer peripheral surface of the liner 1. The FW apparatus 100 mainly includes a liner transport device 10, a helical winding device 20, a hoop winding device 30, a creel stand 40 and a control unit 50.

The liner 1 is a substantially cylindrical hollow vessel formed by high-intensity aluminum material, polyamide system resin or the like, for example. Pressure resistance of the liner 1 is improved by winding the fiber bundle F onto the outer peripheral surface of the liner 1. Namely, the liner 1 is a base material constituting a pressure-resistant vessel.

The liner transport device 10 transports the liner 1 while rotating or not rotating the liner 1. In detail, the liner transport device 10 rotates the liner 1 with the longitudinal direction of the FW apparatus 100 as a rotation axis and transports the liner 1 along the longitudinal direction of the FW apparatus 100. The liner transport device 10 mainly includes a pedestal 11, a liner support part 12 and driving shafts 13.

The pedestal 11 is mounted on a rail extended along the longitudinal direction of the FW apparatus 100. A pair of the liner support part 12 and the driving shafts 13 is provided in the pedestal 11. The liner 1 attached to the driving shafts 13 is rotated integrally with the driving shafts 13.

According to the construction, in the liner transport device 10, the liner 1 can be rotated with the longitudinal direction of the FW apparatus 100 as the rotation axis and the liner 1 can be transported along the longitudinal direction of the FW apparatus 100.

The helical winding device 20 winds the fiber bundles F onto the outer peripheral surface of the liner 1. In detail, the helical winding device 20 performs helical winding in which a winding angle of the fiber bundle F is substantially slanted relative to the longitudinal direction of the FW apparatus 100. The helical winding device 20 mainly includes a pedestal 21 and a helical mounting device 22.

The helical mounting device 22 is provided in the pedestal 21. A plurality of fiber bundle guides 23 are provided in the helical mounting device 22. The fiber bundle F guided by each of the fiber bundle guides 23 is wound onto the outer peripheral surface of the liner 1 which passes while being rotated.

According to the construction, the helical winding device 20 can perform helical winding in which the winding angle of the fiber bundle F is substantially slanted relative to the longitudinal direction of the FW apparatus 100.

The hoop winding device 30 winds the fiber bundle F onto the outer peripheral surface of the liner 1. In detail, the hoop winding device 30 performs hoop winding in which the winding angle of the fiber bundle F is substantially perpendicular to the longitudinal direction of the FW apparatus 100. The hoop winding device 30 mainly includes a pedestal 31 and a hoop mounting device 32.

The hoop mounting device 32 is provided in the pedestal 31. The hoop mounting device 32 has a plurality of bobbins B on which the fiber bundles F are wound. The fiber bundle F unwound from each of the bobbins B is wound onto the outer peripheral surface of the liner 1 by self-rotation of the hoop mounting device 32.

According to the construction, the hoop winding device 30 can perform hoop winding in which the winding angle of the fiber bundle F is substantially perpendicular to the longitudinal direction of the FW apparatus 100.

The creel stand 40 supplies the fiber bundles F to the helical winding device 20. In detail, the creel stand 40 supplies the fiber bundle F to each of the fiber bundle guides 23 of the helical mounting device 22 constituting the helical winding device 20. The creel stand 40 mainly includes a rack 41, bobbin shafts 42 and rollers 43.

The plurality of the bobbin shafts 42 and the rollers 43 are attached in parallel to each other to the rack 41. The bobbins B are rotated by pulling the fiber bundles F while being supported by the bobbin shafts 42 so that the fiber bundles F are unwound. Then, the fiber bundles F unwound from the bobbins B are sent via the rollers 43 to the fiber bundle guides 23.

According to the construction, the creel stand 40 can supply the fiber bundle F to each of the fiber bundle guides 23 of the helical mounting device 22 constituting the helical winding device 20.

Next, an explanation will be given on the liner transport device 10 constituting the FW apparatus 100 in more detail.

Figure 2:
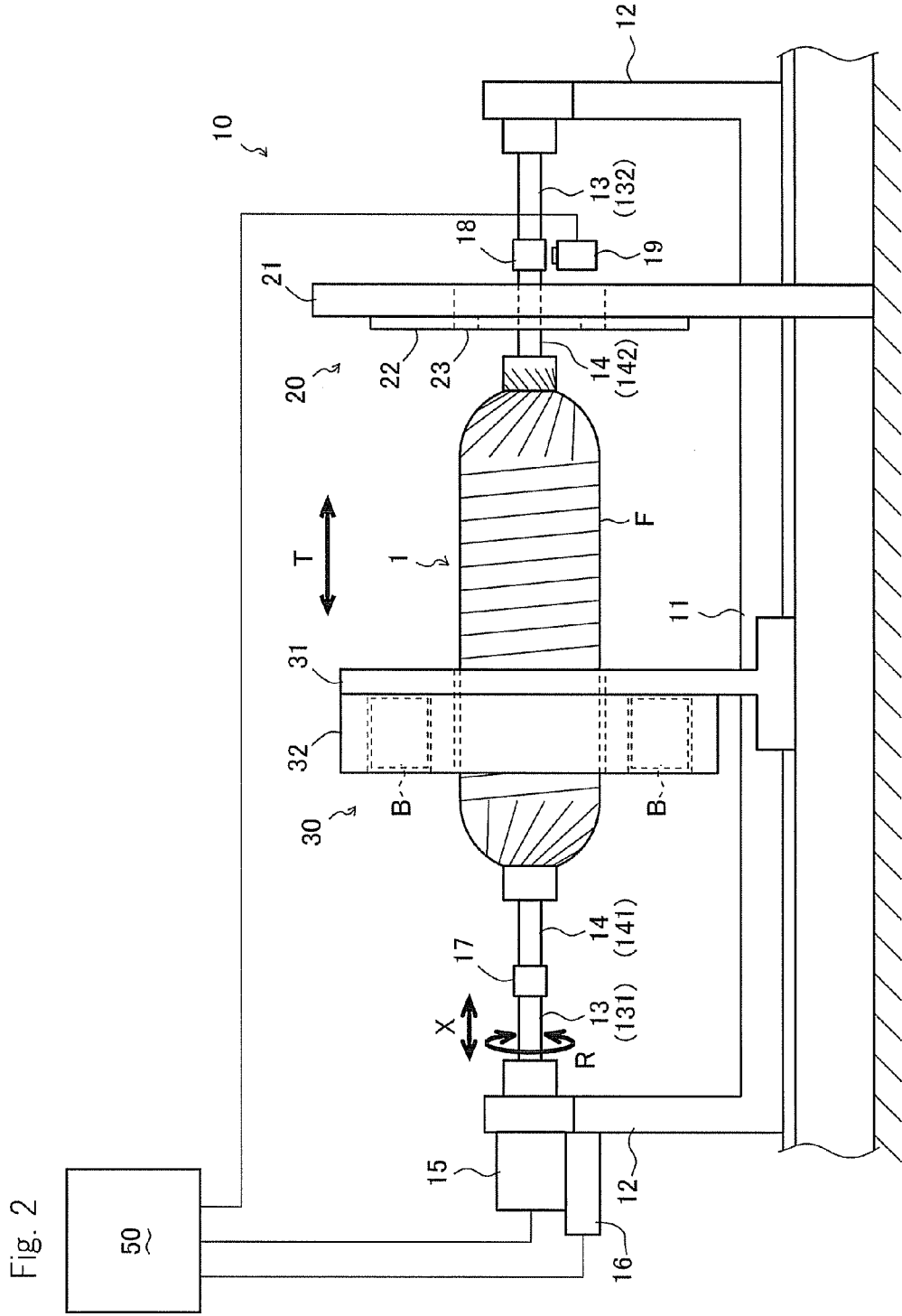
FIG. 2 is a drawing of a configuration of a liner transport device.

FIG. 2 is a drawing of the configuration of the liner transport device 10. An arrow T in the drawing shows the transport direction of the liner 1. An arrow R in the drawing shows a rotation direction of the driving shafts 13. An arrow X in the drawing shows a slide direction of the driving shafts 13.

Driven shafts 14 are attached to the liner 1 from the beginning. The driven shaft 14 attached to one of the ends of the liner 1 is defined as "first driven shaft 141", and the driven shaft 14 attached to the other end of the liner 1 is defined as "second driven shaft 142". The driving shaft 13 connected to the first driven shaft 141 is defined as "first driving shaft 131", and the driving shaft 13 connected to the second driven shaft 142 is defined as "second driving shaft 132".

The liner transport device 10 has a rotation unit 15 and a slide unit 16. The liner transport device 10 has two connection units 17 and 18.

The rotation unit 15 can rotate the first driving shaft 131 forward or reversely (see the arrow R). Namely, among the first driving shaft 131 and the second driving shaft 132 constituting the driving shafts 13, the rotation unit 15 can rotate only the first driving shaft 131 actively. The rotation unit 15 may alternatively be enabled to rotate only the second driving shaft 132 actively. The rotation unit 15 may alternatively be enabled to rotate both the first driving shaft 131 and the second driving shaft 132 actively. In the FW apparatus 100, the control unit 50 can control start or stop of the rotation of the first driving shaft 131.

The slide unit 16 can slide the first driving shaft 131 along an axial direction (see the arrow X). Namely, among the first driving shaft 131 and the second driving shaft 132 constituting the driving shafts 13, the slide unit 16 can slide only the first driving shaft 131 along the longitudinal direction of the FW apparatus 100. The slide unit 16 may alternatively be enabled to slide only the second driving shaft 132. The slide unit 16 may alternatively be enabled to slide both the first driving shaft 131 and the second driving shaft 132. In the FW apparatus 100, the control unit 50 can control start or stop of the slide of the first driving shaft 131.

When phases of the first driven shaft 141 and the first driving shaft 131 are in agreement with each other, the connection unit 17 can connect the first driven shaft 141 to the first driving shaft 131. When phases of the second driven shaft 142 and the second driving shaft 132 are in agreement with each other, the connection unit 18 can connect the second driven shaft 142 to the second driving shaft 132. The construction of the connection units 17 and 18 is explained below.

Figure 3:
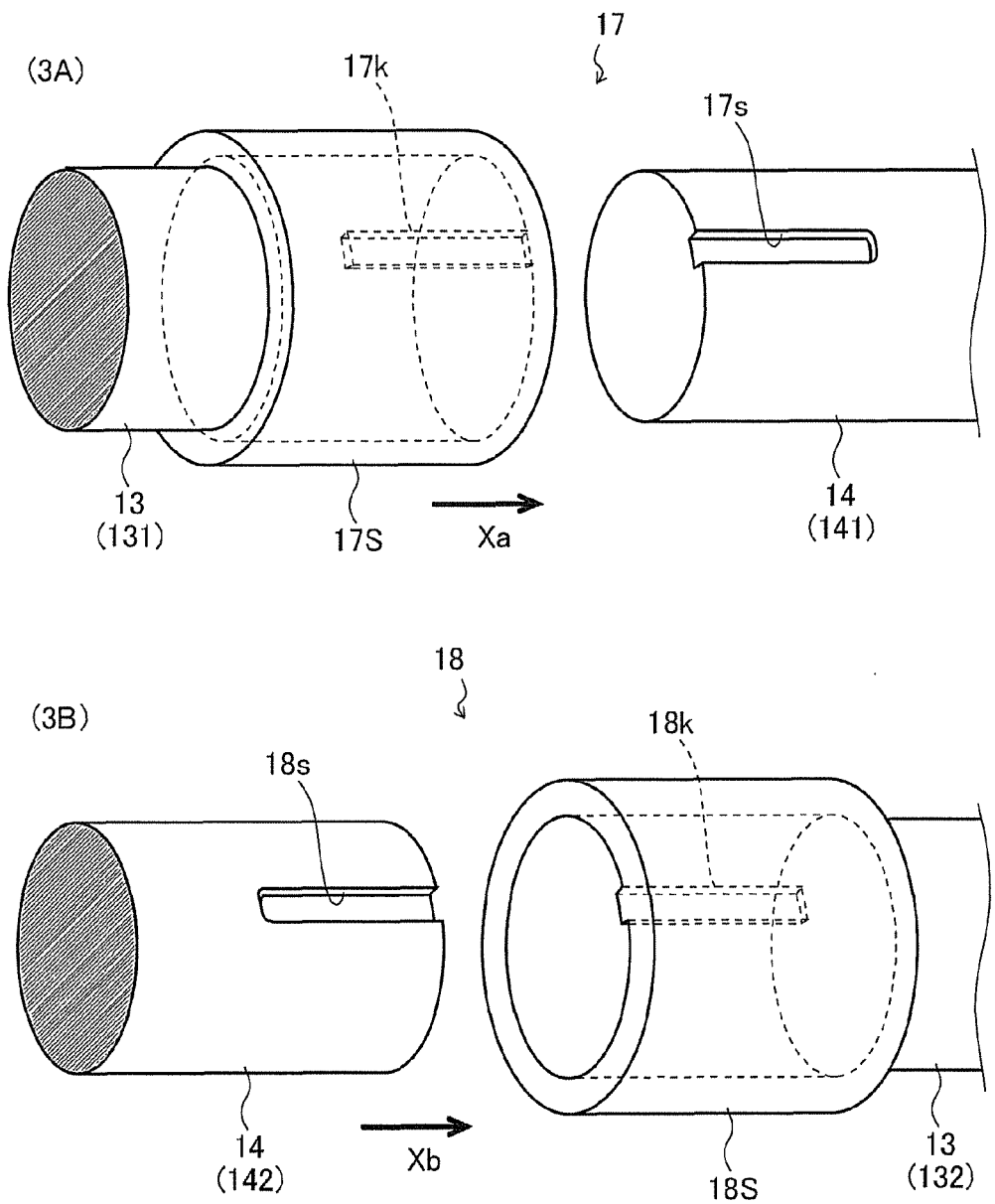
FIG. 3 is a drawing of a construction of connection units.

FIG. 3 is a drawing of the construction of the connection units 17 and 18. An arrow Xa in the drawing shows the slide direction of the first driving shaft 131. An arrow Xb in the drawing shows a movement direction of the second driven shaft 142 at the time at which the liner 1 is moved following the slide of the first driving shaft 131.

As shown in FIG. 3A, the connection unit 17 is provided at an end of the first driving shaft 131. The connection unit 17 has a substantially cylindrical socket part 17S to which the first driven shaft 141 is mainly inserted. A key 17k is provided in the socket part 17S along an axial direction of the socket part 17S (the longitudinal direction of the FW apparatus 100), and the key 17k can be inserted into a key groove 17s of the first driven shaft 141. Then, in the FW apparatus 100, when the phases of the first driven shaft 141 and the first driving shaft 131 are in agreement with each other, the key 17k is engaged with the key groove 17s, whereby the first driven shaft 141 is connected to the first driving shaft 131. Accordingly, the first driven shaft 141 can be connected to the first driving shaft 131 certainly with simple construction. Since the phase of the first driven shaft 141 is fixed in the FW apparatus 100, the phases of the first driven shaft 141 and the first driving shaft 131 can be made in agreement with each other easily. The reason why the phase of the first driven shaft 141 is fixed will be discussed later.

As shown in FIG. 3B, the connection unit 18 is provided at an end of the second driving shaft 132. The connection unit 18 has a substantially cylindrical socket part 18S to which the second driven shaft 142 is mainly inserted. A key 18k is provided in the socket part 18S along an axial direction of the socket part 18S (the longitudinal direction of the FW apparatus 100), and the key 18k can be inserted into a key groove 18s of the second driven shaft 142. Then, in the FW apparatus 100, when the phases of the second driven shaft 142 and the second driving shaft 132 are in agreement with each other, the key 18k is engaged with the key groove 18s, whereby the second driven shaft 142 is connected to the second driving shaft 132. Accordingly, the second driven shaft 142 can be connected to the second driving shaft 132 certainly with simple construction. In the FW apparatus 100, the phases of the second driven shaft 142 and the second driving shaft 132 can be made in agreement with each other by adjustment action. The adjustment action will be discussed later.

Furthermore, the liner transport device 10 has a detection unit 19 (see FIG. 2). The construction of the detection unit 19 is explained below.

Figure 4:
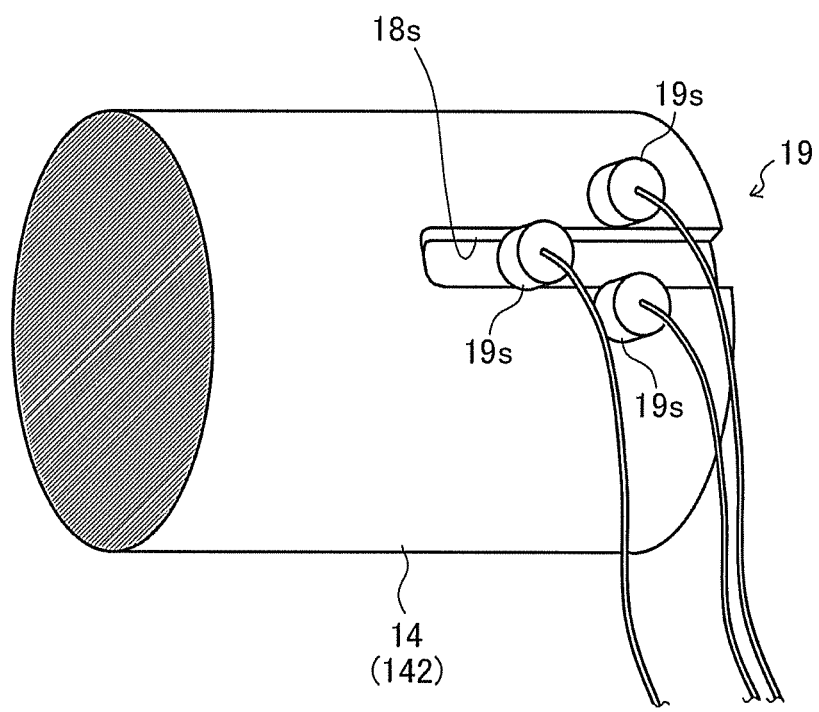
FIG. 4 is a drawing of a construction of a detection unit.

FIG. 4 is a drawing of the construction of the detection unit 19.

In the FW apparatus 100, the detection unit 19 can detect the phase of the second driven shaft 142. Concretely, the detection unit 19 can detect the key groove 18s of the second driven shaft 142. Then, the control unit 50 can grasp a position of the key groove 18s in a peripheral direction based on information obtained from the detection unit 19. Namely, the control unit 50 can grasp the phase of the second driving shaft 132.

The detection unit 19 is provided near the second driven shaft 142. The detection unit 19 has optical sensors 19s which can detect the key groove 18s of the second driven shaft 142. Each of the optical sensors 19s includes a so-called photo-transistor and changes an electric signal corresponding to a light receiving amount. Accordingly, the control unit 50 can grasp the phase of the second driven shaft 142 based on the electric signal from the detection unit 19. The optical sensors 19s can detect the key groove 18s without contacting the second driven shaft 142. Accordingly, failure or error detection caused by wear can be prevented certainly so as to detect the phase of the second driven shaft 142. The detection unit 19 has the three optical sensors 19s in the peripheral direction of the second driven shaft 142 so as to detect the phase of the second driven shaft 142 with high accuracy.

Next, an explanation will be given on the action of attaching the liner 1.

Figure 5:
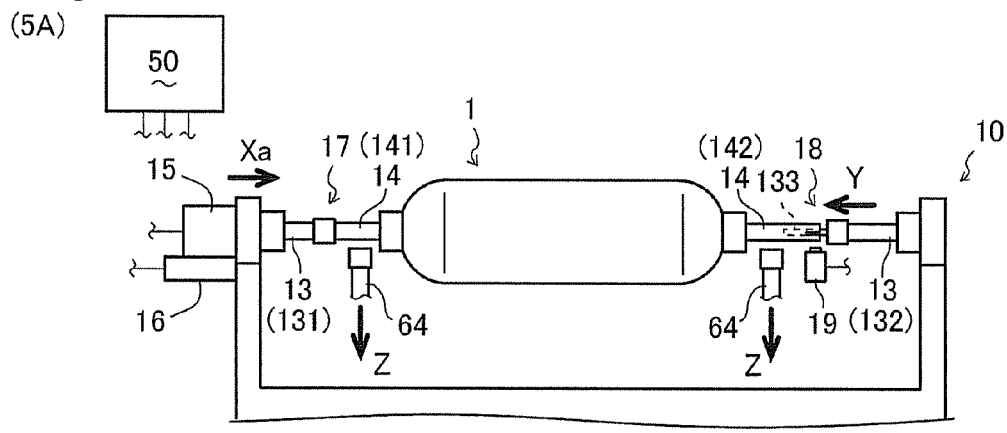
FIG. 5 is a drawing of the action of attaching a liner.
Figure 5:
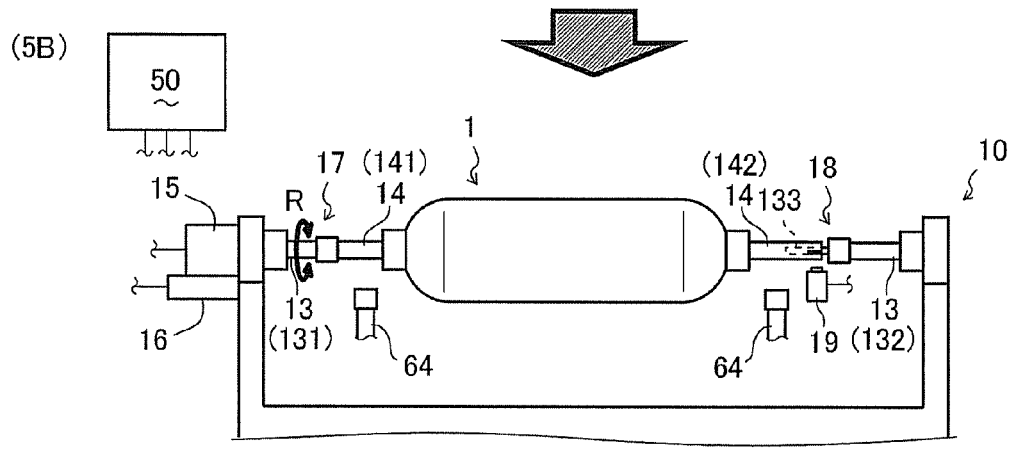
Figure 5:
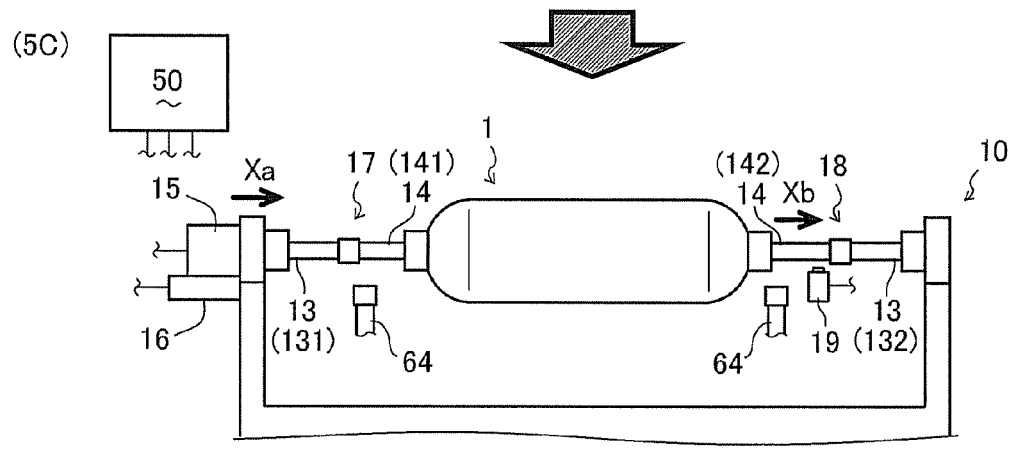

FIG. 5 is a drawing of the action of attaching the liner 1. An arrow Xa in the drawing shows the slide direction of the first driving shaft 131. An arrow Xb in the drawing shows the movement direction of the second driven shaft 142 at the time at which the liner 1 is moved following the slide of the first driving shaft 131. An arrow Y in the drawing shows a direction of a guide shaft 133. An arrow Z in the drawing shows a movement direction of a stand 64. An arrow R in the drawing shows the rotation direction of the first driving shaft 131. In the below explanation, it is assumed that the liner 1 is arranged at a predetermined position.

Firstly, as shown in FIG. 5A, the slide unit 16 slides the first driving shaft 131 (see the arrow Xa). Concretely, the control unit 50 controls the slide unit 16 so as to slide the first driving shaft 131. Then, the first driven shaft 141 is inserted into the socket part 17S constituting the connection unit 17 (see FIG. 3A). Accordingly, one of the ends of the liner 1 is supported by the first driving shaft 131. At this time, the key 17k of the first driving shaft 131 is inserted into the key groove 17s of the first driven shaft 141, whereby the first driven shaft 141 is connected to the first driving shaft 131 (see FIG. 3A).

Simultaneously, a certain unit slides the guide shaft 133 (see the arrow Y). Concretely, the control unit 50 controls the certain unit so as to slide the guide shaft 133. Then, the guide shaft 133 is inserted into the second driven shaft 142. Accordingly, the other end of the liner 1 is supported by the guide shaft 133.

Subsequently, the certain unit moves the stand 64 downward (see the arrow Z). Concretely, the control unit 50 controls the certain unit so as to move the stand 64 downward. Accordingly, the liner 1 is rotatable while being supported by the first driving shaft 131 and the guide shaft 133.

Next, as shown in FIG. 5B, the rotation unit 15 rotates the first driving shaft 131 and adjusts the phase thereof so as to make the phases of the second driven shaft 142 and the second driving shaft 132 in agreement with each other (see the arrow R). Concretely, the control unit 50 controls the rotation unit 15 so as to rotate the first driving shaft 131 and adjust the phase thereof, thereby making the phases of the second driven shaft 142 and the second driving shaft 132 in agreement with each other. Namely, by rotating the liner 1 together with the first driving shaft 131, the second driven shaft 142 attached to the liner 1 is rotated so as to adjust the phase of the second driven shaft 142. Such action is referred to as "adjustment action".

Subsequently, as shown in FIG. 5C, the slide unit 16 slides the first driving shaft 131 further (see the arrow Xa). Concretely, the control unit 50 controls the slide unit 16 so as to slide the first driving shaft 131 further. Then, the liner 1 is moved following the slide of the first driving shaft 131, whereby the second driven shaft 142 attached to the liner 1 is also moved (see the arrow Xb). Accordingly, the second driven shaft 142 is inserted into the socket part 18S constituting the connection unit 18 (see FIG. 3B). At this time, the key 18k of the second driving shaft 132 is inserted into the key groove 18s of the second driven shaft 142, whereby the second driven shaft 142 is connected to the second driving shaft 132 (see FIG. 3B).

Accordingly, in the FW apparatus 100, the first driven shaft 141 can be connected to the first driving shaft 131 automatically. In the FW apparatus 100, the phases of the second driven shaft 142 and the second driving shaft 132 can be made in agreement with each other so as to connect them to each other automatically. Namely, the FW apparatus 100 can be equipped with the liner 1 automatically.

Next, an explanation will be given on the adjustment action in detail.

Figure 6:
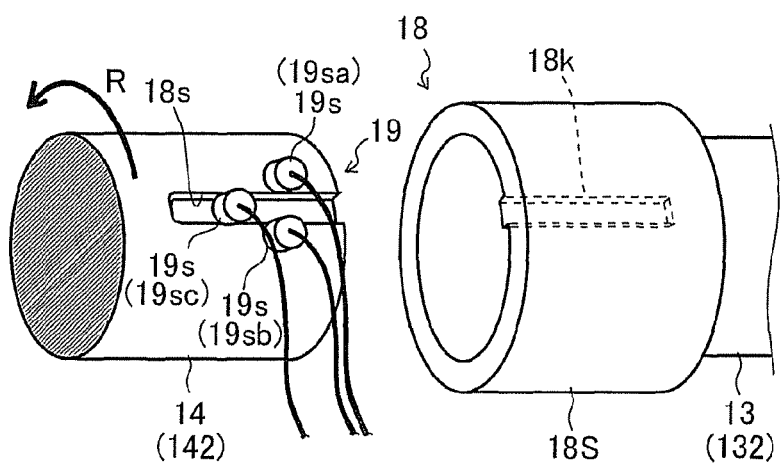
FIG. 6 is a drawing of action matching phases of a driven shaft and a driving shaft.
Figure 6:
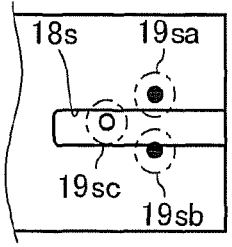
Figure 6:
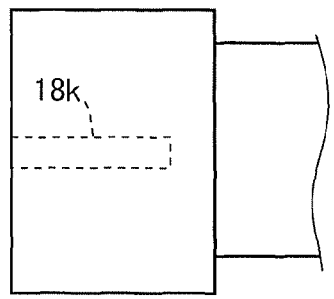
Figure 6:
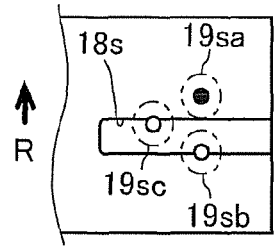
Figure 6:
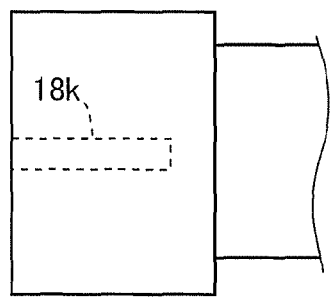
Figure 6:
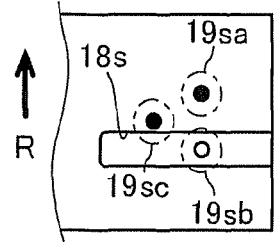
Figure 6:
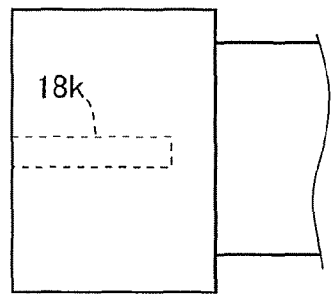
Figure 7:
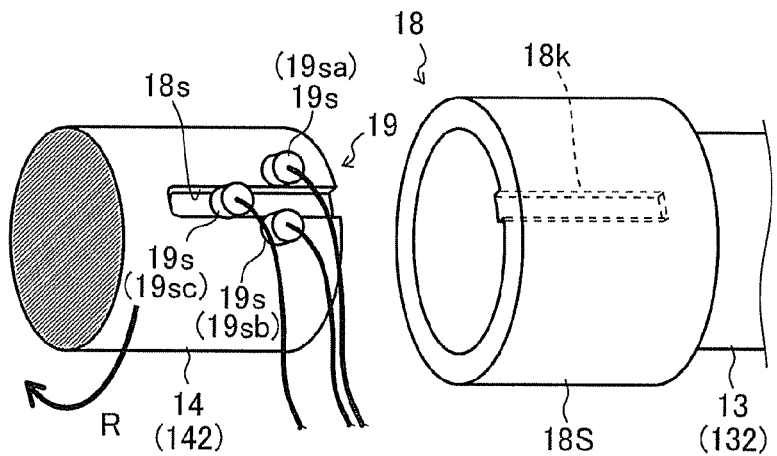
FIG. 7 is a drawing of the action matching phases of the driven shaft and the driving shaft.
Figure 7:
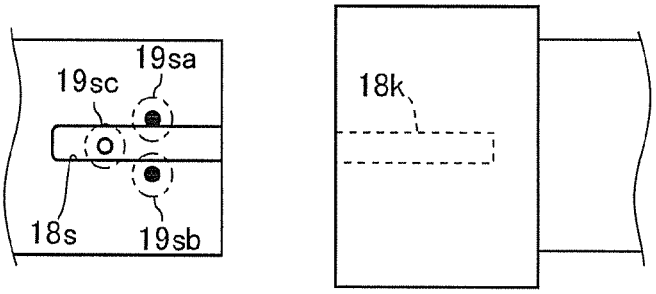
Figure 7:
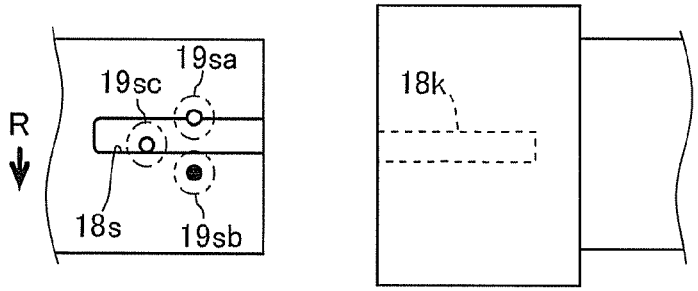
Figure 7:
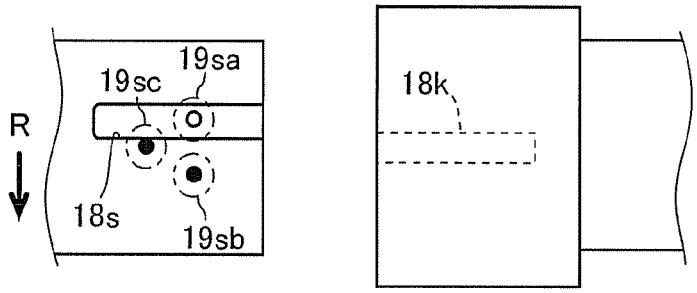

FIG. 6 is a drawing of the action of rotating the first driving shaft 131 forward so as to match the phases of the second driven shaft 142 and the second driving shaft 132 (adjustment action). FIG. 7 is a drawing of the action of rotating the first driving shaft 131 reversely so as to match the phases of the second driven shaft 142 and the second driving shaft 132 (adjustment action). An arrow R in the drawing shows a rotation direction of the second driven shaft 142 at the time at which the liner 1 is rotated following the slide of the first driving shaft 131. White circles in the drawing show the case in which the optical sensors 19s can detect the key groove 18s, and black circles in the drawing show the case in which the optical sensors 19s cannot detect the key groove 18s.

As mentioned above, the detection unit 19 has the three optical sensors 19s in the peripheral direction of the second driven shaft 142. Concretely, the detection unit 19 has the two optical sensors 19s with an interval larger than a width of the key groove 18s, and has the one optical sensor 19s between the two optical sensors 19s. Herein, it is defined that one of the two optical sensors 19s is a "first sensor 19sa", the other of the two optical sensors 19s is a "second sensor 19sb", and the optical sensor 19s arranged between the first sensor 19sa and the second sensor 19sb is a "central sensor 19sc".

FIG. 6A shows the case in which the first sensor 19sa and the second sensor 19sb cannot detect the key groove 18s and the central sensor 19sc can detect the key groove 18s. In this case, it is clear that the key groove 18s exists between the first sensor 19sa and the second sensor 19sb and below the central sensor 19sc. Accordingly, the control unit 50 can grasp the phase of the second driving shaft 132.

In such a state, the control unit 50 judges that the phases of the second driven shaft 142 and the second driving shaft 132 are in agreement with each other. Therefore, the control unit 50 does not rotate the first driving shaft 131. Namely, the control unit 50 does not adjust the phase of the second driven shaft 142.

FIG. 6B shows the case in which the first sensor 19sa cannot detect the key groove 18s and the second sensor 19sb and the central sensor 19sc can detect the key groove 18s. In this case, it is clear that the key groove 18s exists near the first sensor 19sa and below the second sensor 19sb and the central sensor 19sc. Accordingly, the control unit 50 can grasp the phase of the second driving shaft 132.

In such a state, the control unit 50 judges that the phases of the second driven shaft 142 and the second driving shaft 132 are shifted from each other. Accordingly, the control unit 50 rotates the first driving shaft 131 forward. Namely, the control unit 50 rotates the second driven shaft 142 forward so as to adjust the phase (see the arrow R). Then, the control unit 50 stops the rotation at the phase at which the first sensor 19sa and the second sensor 19sb cannot detect the key groove 18s and only the central sensor 19sc can detect the key groove 18s (see FIG. 6A).

FIG. 6C shows the case in which the first sensor 19sa and the central sensor 19sc cannot detect the key groove 18s and the second sensor 19sb can detect the key groove 18s. In this case, it is clear that the key groove 18s exists near the central sensor 19sc and below the second sensor 19sb. Accordingly, the control unit 50 can grasp the phase of the second driving shaft 132.

In such the state, the control unit 50 judges that the phases of the second driven shaft 142 and the second driving shaft 132 are shifted from each other. Accordingly, the control unit 50 rotates the first driving shaft 131 forward. Namely, the control unit 50 rotates the second driven shaft 142 forward so as to adjust the phase (see the arrow R). Then, the control unit 50 stops the rotation at the phase at which the first sensor 19sa and the second sensor 19sb cannot detect the key groove 18s and only the central sensor 19sc can detect the key groove 18s (see FIG. 6A).

Though not shown in the drawing, there may be a case in which all the sensors 19sa, 19sb and 19sc cannot detect the key groove 18s. In this case, the control unit 50 cannot grasp the phase of the second driving shaft 132.

In such a state, the control unit 50 rotates the second driven shaft 142 so as to adjust the phase (see the arrow R). Then, the control unit 50 stops the rotation at the phase at which the first sensor 19sa and the second sensor 19sb cannot detect the key groove 18s and only the central sensor 19sc can detect the key groove 18s (see FIG. 6A). In the case of rotating the second driven shaft 142 at a normal speed, the control unit 50 stops the rotation when the second sensor 19sb and the central sensor 19sc detect the key groove 18s. In the case of rotating the second driven shaft 142 at a speed higher than the normal speed, the control unit 50 stops the rotation when the second sensor 19sb detects the key groove 18s. That is because the rotation of the second driven shaft 142 is stopped at the suitable phase according to this control. In other words, the control unit 50 rotates the second driven shaft 142 at a speed at which such control can be realized.

FIG. 7A shows the case in which the first sensor 19sa and the second sensor 19sb cannot detect the key groove 18s and the central sensor 19sc can detect the key groove 18s. In this case, it is clear that the key groove 18s exists between the first sensor 19sa and the second sensor 19sb and below the central sensor 19sc. Accordingly, the control unit 50 can grasp the phase of the second driving shaft 132.

In such a state, the control unit 50 judges that the phases of the second driven shaft 142 and the second driving shaft 132 are in agreement with each other. Therefore, the control unit 50 does not rotate the first driving shaft 131. Namely, the control unit 50 does not adjust the phase of the second driven shaft 142.

FIG. 7B shows the case in which the second sensor 19sb cannot detect the key groove 18s and the first sensor 19sa and the central sensor 19sc can detect the key groove 18s. In this case, it is clear that the key groove 18s exists near the second sensor 19sb and below the first sensor 19sa and the central sensor 19sc. Accordingly, the control unit 50 can grasp the phase of the second driving shaft 132.

In such a state, the control unit 50 judges that the phases of the second driven shaft 142 and the second driving shaft 132 are shifted from each other. Accordingly, the control unit 50 rotates the first driving shaft 131 reversely. Namely, the control unit 50 rotates the second driven shaft 142 reversely so as to adjust the phase (see the arrow R). Then, the control unit 50 stops the rotation at the phase at which the first sensor 19sa and the second sensor 19sb cannot detect the key groove 18s and only the central sensor 19sc can detect the key groove 18s (see FIG. 7A).

FIG. 7C shows the case in which the second sensor 19sb and the central sensor 19sc cannot detect the key groove 18s and the first sensor 19sa can detect the key groove 18s. In this case, it is clear that the key groove 18s exists near the central sensor 19sc and below the first sensor 19sa. Accordingly, the control unit 50 can grasp the phase of the second driving shaft 132.

In such a state, the control unit 50 judges that the phases of the second driven shaft 142 and the second driving shaft 132 are shifted from each other. Accordingly, the control unit 50 rotates the first driving shaft 131 reversely. Namely, the control unit 50 rotates the second driven shaft 142 reversely so as to adjust the phase (see the arrow R). Then, the control unit 50 stops the rotation at the phase at which the first sensor 19sa and the second sensor 19sb cannot detect the key groove 18s and only the central sensor 19sc can detect the key groove 18s (see FIG. 7A).

Though not shown in the drawing, there may be a case in which all the sensors 19sa, 19sb and 19sc cannot detect the key groove 18s. In this case, the control unit 50 cannot grasp the phase of the second driving shaft 132.

In such a state, the control unit 50 rotates the second driven shaft 142 so as to adjust the phase (see the arrow R). Then, the control unit 50 stops the rotation at the phase at which the first sensor 19sa and the second sensor 19sb cannot detect the key groove 18s and only the central sensor 19sc can detect the key groove 18s (see FIG. 7A). In the case of rotating the second driven shaft 142 at a normal speed, the control unit 50 stops the rotation when the first sensor 19sa and the central sensor 19sc detect the key groove 18s. In the case of rotating the second driven shaft 142 at a speed higher than the normal speed, the control unit 50 stops the rotation when the first sensor 19sa detects the key groove 18s. That is because the rotation of the second driven shaft 142 is stopped at the suitable phase according to this control. In other words, the control unit 50 rotates the second driven shaft 142 at a speed at which such control can be realized.

Next, an explanation will be given on another characteristic of the FW apparatus 100.

The FW apparatus 100 has a supply unit 60 and a discharge unit 70 (see FIG. 1). The supply unit 60 and the discharge unit 70 are explained below.

Figure 8:
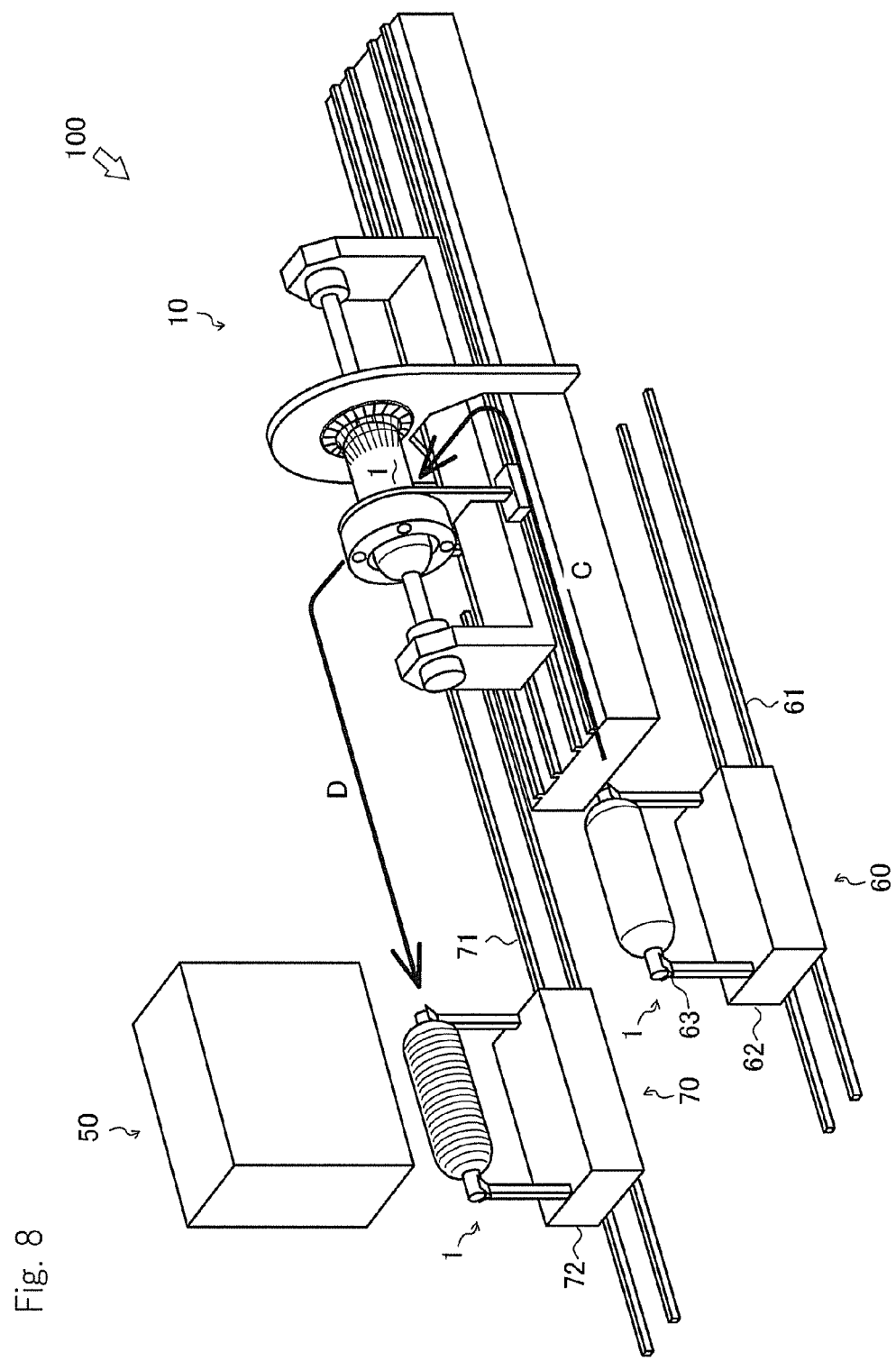
FIG. 8 is a drawing of the action of supplying and discharging the liner.

FIG. 8 is a drawing of the action of supplying the liner 1 and discharging the liner 1. An arrow C in the drawing shows a route of the liner 1 supplied to a predetermined position. An arrow D in the drawing shows a route of the liner 1 discharged from the predetermined position. The "predetermined position" is a position at which the driven shaft 14 (141 and 142) is connected to the driving shaft 13 (131 and 132) on the liner transport device 10.

The supply unit 60 mainly includes a rail 61 extended along the longitudinal direction of the FW apparatus 100 and a cart 62 mounted on the rail 61. The supply unit 60 can move while the liner 1 is mounted thereon so as to supply the liner 1 to the predetermined position (see the arrow C).

The discharge unit 70 mainly includes a rail 71 extended along the longitudinal direction of the FW apparatus 100 and a cart 72 mounted on the rail 71. The discharge unit 70 can discharge the liner 1 from the predetermined position and move while the liner 1 is mounted thereon (see the arrow D).

The supply unit 60 can characteristically supply the liner 1 to the predetermined position so as to make the phase of the first driven shaft 141, attached to the liner 1, the predetermined value. Then, the supply unit 60 has a judgment unit 63 so as to realize such the characteristic. The judgment unit 63 is explained below.

FIG. 9 is a drawing of the construction in which the first driven shaft 141 can be mounted so as to make the phase thereof the predetermined value. An arrow P in the drawing shows a projecting direction of a projection 63p constituting the judgment unit 63.

A slit 63c is provided in the first driven shaft 141 along an axial direction of the first driven shaft 141. In this embodiment, the slit 63c is provided at a position opposite to the key groove 17s (a position at which a phase angle is 180°). On the other hand, in the judgment unit 63, the projection 63p is provided slidably. The projection 63p is biased by a spring. Furthermore, the judgment unit 63 has a sensor 63s which can detect action of the projection 63p. Accordingly, in the judgment unit 63, since the projection 63p is inserted into the slit 63c on condition that the phase of the driven axis 141 is the predetermined value, the sensor 63s can detect the action of the projection 63p. Accordingly, based on information obtained from the judgment unit 63, the control unit 50 can judge whether the phase of the first driven shaft 141 is the predetermined value or not. Namely, the control unit 50 can judge whether the liner 1 is mounted so as to make the phase of the first driven shaft 141 the predetermined value or not.

After the judgment unit 63 judges that the liner 1 is mounted so as to make the phase of the first driven shaft 141 the predetermined value, the supply unit 60 supplies the liner 1 to the predetermined position. Accordingly, the phase of the first driven shaft 141 is fixed certainly.

Furthermore, after the discharge unit 70 discharges the liner 1 from the predetermined position, the supply unit 60 supplies the new liner 1 to the predetermined position. Accordingly, the time for exchanging the liner 1 can be shortened.

DESCRIPTION OF NOTATIONS 100 filament winding apparatus (FW apparatus)
1 liner
10 liner transport device
13 driving shaft
131 first driving shaft
132 second driving shaft
14 driven shaft
141 first driven shaft
142 second driven shaft
15 rotation unit
16 slide unit
17 connection unit
17k key
17s key groove
18 connection unit
18k key
18s key groove
19 detection unit
19s optical sensor
19sa first sensor
19sb second sensor
19sc central sensor
F fiber bundle

The invention claimed is:

1. A filament winding apparatus comprising:
a rotation unit which can rotate a driving shaft forward or reversely;
a control unit which can control start or stop of the rotation of the driving shaft; and
a connection unit which can connect a driven shaft, attached to a liner, to the driving shaft when phases of the driven shaft and the driving shaft are in agreement with each other;
wherein
a fiber bundle is wound onto an outer peripheral surface of the liner by rotating the liner,
a detection unit is provided which can detect the phase of the driven shaft or the driving shaft, and
based on information obtained from the detection unit at a time of connecting the driven shaft to the driving shaft, the control unit rotates the driving shaft and adjusts the phase thereof so as to make the phases of the driven shaft and the driving shaft in agreement with each other.

2. The filament winding apparatus according to claim 1, wherein
a slide unit is provided which can slide the driving shaft along an axial direction, and
after rotating the driving shaft and adjusting the phase thereof so as to make the phases of the driven shaft and the driving shaft in agreement with each other, the control unit slides the driving shaft along the axial direction so as to connect the shafts to each other.

3. The filament winding apparatus according to claim 1, wherein the connection unit engages a key or a key groove of the driven shaft with a key groove or a key of the driving shaft so as to connect the shafts to each other.

4. The filament winding apparatus according to claim 3, wherein the detection unit has an optical sensor detecting the key or the key groove of the driven shaft or the key groove or the key of the driving shaft.

5. The filament winding apparatus according to claim 4, wherein the detection unit has two optical sensors with an interval larger than a width of the key or the key groove in a peripheral direction of the driven shaft or the driving shaft, and has one optical sensor between the two optical sensors.

6. The filament winding apparatus according to claim 1, wherein
a supply unit is provided which can move while the liner is mounted thereon and supply the liner to a predetermined position at which the driven shaft is connected to the driving shaft, and
the supply unit supplies the liner to the predetermined position so as to make the phase of the driven shaft a predetermined value.

7. The filament winding apparatus according to claim 6, wherein
a judgment unit is provided which can judge whether the liner is mounted so as to make the phase of the driven shaft the predetermined value or not, and
the supply unit supplies the liner to the predetermined position after the judgment unit judges that the liner is mounted so as to make the phase of the driven shaft the predetermined value.

8. The filament winding apparatus according to claim 6, wherein
a discharge unit is provided which can discharge the liner from the predetermined position and move while the liner is mounted thereon, and
the supply unit supplies the new liner to the predetermined position after the discharge unit discharges the liner from the predetermined position and makes the liner move.

* * * * *